Patented Aug. 27, 1940

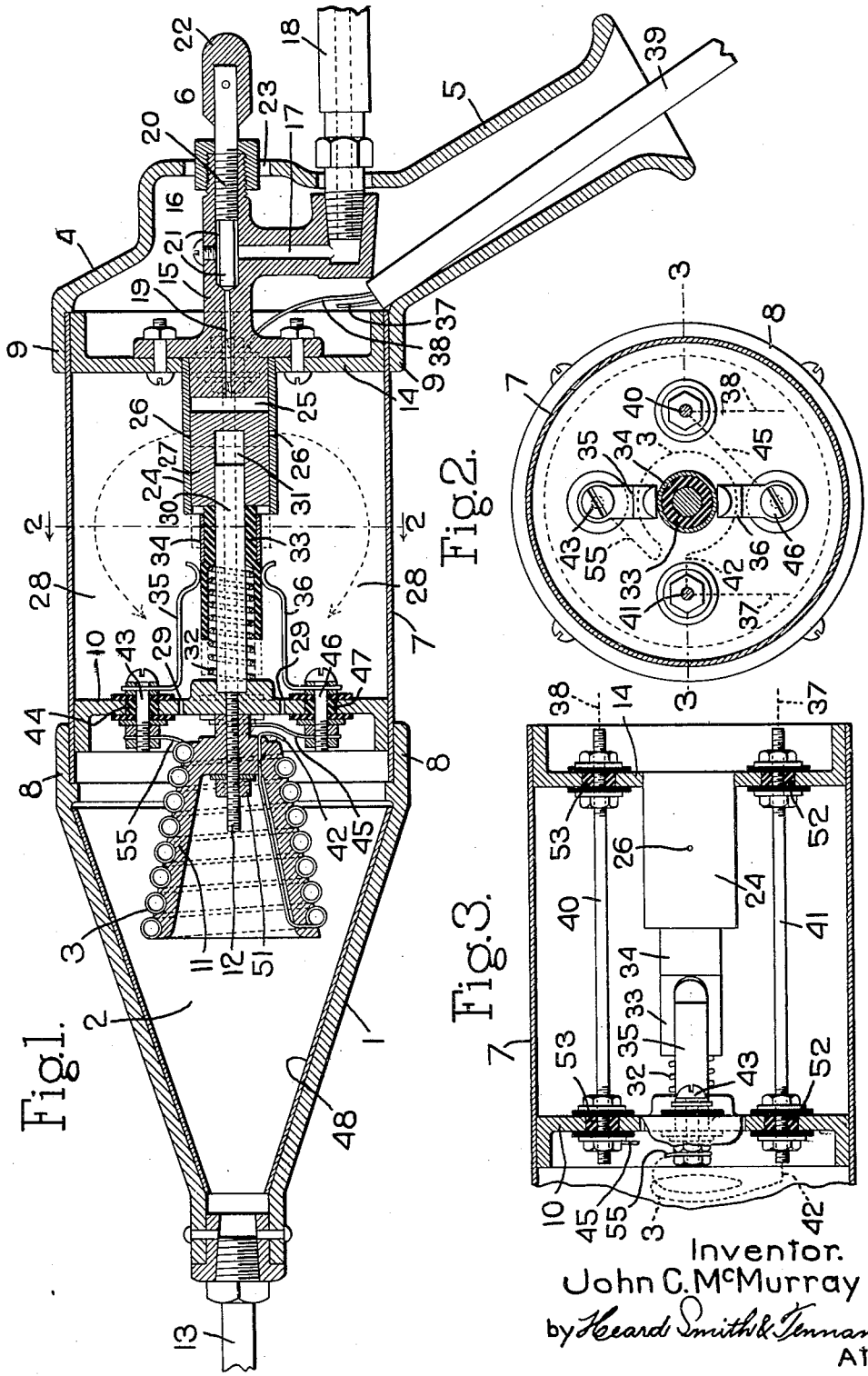

2,212,694

UNITED STATES PATENT OFFICE 2,212,694

HOT AIR GUN

John C. McMurray, Winthrop, Mass.

Application January 18, 1938, Serial No. 185,541

2 Claims. (Cl. 219—39)

This invention relates to a hot air gun and has for one of its objects to provide a device of this kind which is simple and inexpensive to manufacture and which can be easily operated.

A further object of the invention is to provide an improved hot air gun which is so constructed that the handle and casing will not become heated even when the device is used continuously.

A still further object of the invention is to provide an improved hot air gun which can be safely used in an atmosphere that is more or less loaded with combustible vapors.

Other objects of the invention are to improve generally hot air guns in the particulars more fully hereinafter set forth.

In the drawing wherein I have shown a selected embodiment of my invention;

Fig. 1 is a longitudinal section through a hot air gun embodying my invention;

Fig. 2 is a section on the line 2—2, Fig. 1;

Fig. 3 is a section through the casing on the line 3—3, Fig. 2.

My improved hot air gun comprises a front casing member 1 enclosing a heating chamber 2 in which is received an electric heating coil 3, a rear casing member 4 which is provided with a hollow pistol-grip handle 5 and which supports a suitable air-control valve 6, and a housing member 7 connecting the two casing members 1 and 4 and enclosing the automatic switch by which the heating circuit is controlled. The housing member 7 is shown as made of sheet metal and is cylindrical in form. The forward end of said housing member fits within the circular flange 8 at the rear of the casing member 1 and the rear end of said housing member 7 fits within a circular flange 9 with which the casing member 4 is provided.

Situated within the housing member 7 at its forward end is a head or disk 10 to which the heating coil 3 is secured. This heating coil 3 is carried by a conical-shaped base 11 of insulating material and said base is mounted on and carried by a screw-threaded stem 12 which extends from the head 10, said base being clamped to the head by the clamping nut 51 which is screw threaded to the stem.

The front casing member 1 is conical in shape and at its small end it is provided with a hot air delivery pipe 13 through which the heated air is delivered. The conical base 11, which is located within the heating chamber 2, is secured to the head 10 with the smaller end thereof adjacent the head and the larger end directed away from said head, the purpose of this arrangement being to secure a greater efficiency in heating the air as will be presently described.

Situated within the rear end of the housing 7 is a rear head 14 to the outer face of which is secured a fitting 15 which constitutes a valve housing for the control valve 6. This fitting is formed with the valve chamber 16 and with an inlet port 17 leading to the valve chamber and which communicates with a compressed air inlet pipe 18. Said fitting is also provided with a discharge duct 19. The control valve, which is designated generally at 6, has a valve stem 20 screw threaded to the fitting 15 and provided with a valve portion 21 which controls the delivery of air through the delivery port 19. The stem 20 of this control valve extends through an opening 23 in the casing member 4 and is provided with a thumb piece 22 by which it may be manipulated.

Secured to the inside of the head 14 is a cylinder member 24 enclosing a cylinder chamber 25 with which the discharge duct 19 communicates. The cylinder 24 is provided with discharge ports 26 opening through its walls and situated within said cylinder is a plunger 27 which, when the hot air gun is not in operation, occupies the full line position shown in Fig. 1 thereby closing the discharge ports 26.

When the control valve 6 is opened, thereby to deliver compressed air to the cylinder chamber 25, the pressure of the air will force the plunger 27 forward into the dotted line position, Fig. 1, thereby uncovering the ports 26 and the compressed air will then pass from the cylinder chamber 25 through the ports 26 into the chamber 28 within the housing member 7. The front head 10 is provided with ports or ducts 29 which provide a communication between the chamber 28 and the heating chamber 2 and, therefore, the compressed air which is admitted to the chamber 28 will pass through these ports 29 into the heating chamber 2 where it will become heated by passing over the heating coil 3.

Extending rearwardly from the head 10 is a rod or post 30, the end of which is received in a recess 31 with which the plunger 27 is provided, this post operating as a stop to limit the forward movement of the plunger when the compressed air is admitted to the cylinder chamber 25. The screw-threaded member 12 by which the heating coil is secured to the head 10 may be made integral with the post 30 if desired.

The plunger 27 is acted on by a spring 32 which surrounds the post 30 and which normally holds said plunger in its retracted position shown in full lines, Fig. 1, said spring yielding when compressed air is admitted to the chamber 25 and thereby allowing the plunger 27 to move forwardly into a position to uncover the ports 26.

The heating circuit for the heating coil 3 is controlled by a switch which is automatically closed when the plunger 27 is moved forwardly into the dotted line position, Fig. 1, and which is automatically opened when the plunger is in its normal position shown in full lines, Fig. 1. By reason of this construction the movement of the plunger 27 from the full to the dotted line position, Fig. 1 by the compressed air admitted to the chamber 25 when the control valve 6 is opened, will not only open the discharge ports 26 and thus provide for the passage of the air through the chamber 28 and the heating chamber 2, but will also close the circuit to the heating unit so as to render the latter operative.

Mounted on the post 30 is a sleeve 33 of insulating material which bears at one end against the plunger 27 and which is acted on by the spring 32. The switch mechanism for opening and closing the heating circuit comprises a contact ring 34 which is carried by the sleeve 33 and two contact arms 35 and 36. The arrangement is such that when the sleeve 33 is in its retracted position shown in full lines, Fig. 1, the contact arms 35, 36 will be out of engagement with the contact ring 34 and will be resting against the sleeve 33, which is of insulating material, but when the plunger 25 is moved forwardly into the dotted line position, Fig. 1 then the contact sleeve 34 is moved into engagement with the contact arms 35, 36 and the switch will be closed. The heating circuit which includes the switch comprising the contact arms 35, 36 and the contact ring 34, includes the lead wires 37, 38 which are carried by a cable 39 that extends through the hollow handle 4. The lead wire 38 is connected to one end of a tie rod 40 which connects the two heads 14 and 10 but is insulated therefrom as shown at 53 and the other lead wire 37 connects to a second tie rod 41 which also connects the two heads 14 and 10 but is insulated therefrom as shown at 52. The right-hand end of the tie rod 41 is connected by a circuit wire 42 to one end of the coil 3 and the other end of said coil is connected to the contact arm 35 through the medium of a circuit connection 55 and a clamping screw 43 that is carried by the head 10 but insulated therefrom as shown at 44. The other contact arm 36 is connected to a circuit connection 45 through the medium of a clamping screw 46 that is carried by the head 10 but insulated therefrom as shown at 47, and the circuit connection 45 leads to and is connected to the tie rod 40.

So long as the plunger 27 and the contact ring 34 is in the full line position, Fig. 1 the heating circuit will be opened but when the control valve 6 is opened to allow compressed air to be admitted to the cylinder chamber 25, the plunger 27 will be moved forward into the dotted line position thereby bringing the contact ring 34 into engagement with the contact arms 35, 36, thus closing the heating circuit. This same movement of the plunger 27 opens the discharge ports 26. When the switch 34, 35, 36 is closed as above described the heating circuit includes the lead wire 37, the tie rod 41, the circuit connection 42, heating coil 3, contact arm 35, contact ring 34, contact arm 36, circuit connection 45, tie rod 40 and lead wire 38.

When the device is in operation the air under pressure will be delivered outwardly through the discharge ports 26 and there will thus be established in the chamber 28 a movement of air between the discharge ports 26 and the ports 29 as indicated by the dotted line arrows in Fig. 1, the current of air flowing over the inner wall of the housing 7. The flow of air in this way keeps the housing 7 cool and prevents the heat generated by the heating coil from being transmitted to the casing member 4.

The arrangement of the heating coil with its small end toward the head 10 and the location of the ports 29 makes an extremely efficient heating unit because the air which is delivered through the ports 29 flows over the heated coil 3 for the full length of the latter. If desired the heating chamber 2 may be provided with a lining 48 of heat-insulating material.

From the above description it will be observed that the operation of my improved hot air gun involves simply the opening and closing of the control valve 6. To place the gun into use the control valve is opened to allow the compressed air to be delivered into the cylinder chamber 25, and the action of the compressed air against the plunger 27 will move the latter forward and thus not only open the discharge ports 26 but also close the switch 34, 35, 36 of the heating circuit, thus setting the heating coil in operation. This circuit will remain closed so long as the control valve is opened. To stop the operation of the heat gun it is only necessary to close the control valve for as soon as said valve is closed the delivery of air through the gun ceases and the spring 32 will return the plunger to its full line position and thus open the circuit of the heating coil. The control valve 6 also provides means for regulating the amount of air which is delivered through the gun. The spring 32 is so designed that even the delivery of a relatively small amount of air through the control valve will actuate the plunger and thus close the heating circuit. Since all the air which is passed through the gun to be heated is taken from a source of supply remote from the place where the gun is being used it will be safe to use the gun in an atmosphere which contains more or less combustible gas without the danger of creating an explosion which might occur if the air which was passed through the heat gun and was heated thereby contained more or less combustible gas. This makes the tool especially desirable for use in garages. One use to which the device is admirably suited is for cleaning out the differential housing or transmission housing of an automobile when it is desired to change the lubricant in the differential or transmission. The delivery of the highly heated air into the differential housing or transmission casing under a high pressure serves not only to blow the lubricant contained therein out through the drain opening but the high heat of the air softens any hardened lubricant and renders it highly fluid so that it will readily drain from the housing.

The heat gun is also eminently suitable for delivering a hot air on the surfaces for purpose of drying them or drying some finish which has been applied to them.

I claim:

1. A hot air gun comprising a front casing member having a heating chamber therein, a rear casing member, a housing member situated between and connecting the casing members, the space within the housing member constituting an air circulating chamber, an apertured head forming a partition between the air circulating chamber and the heating chamber, an electric heating element carried by said head and situated within the heating chamber, a rear head at the rear end of the housing member, a fitting carried thereby and having an air passage for delivery of air to the air circulating chamber, a control valve to control admission of compressed air to said passage, a cylinder member carried by said rear head and situated within the air-circulating chamber and adapted to receive the air delivered from the air passage, said cylinder member having discharge ports leading to the air circulating chamber, a plunger in said cylinder normally closing the discharge ports but movable into a position to open said ports when the control valve is opened, means actuated by the movement of the plunger to close the circuit for the heating element, and a stop member carried by the apertured head and serving to limit the forward movement of the plunger.

2. A hot air gun comprising a front casing member having a heating chamber therein, a rear casing member, a housing member situated between and connecting the casing members, the space within the housing member constituting an air-circulating chamber, an apertured head forming a partition between the air-circulating chamber and the heating chamber, an electric heating element carried by said head and situated within the heating chamber, a rear head at the rear end of the housing member, a fitting carried thereby and having an air passage for delivery of air to the air circulating chamber, a control valve to control admission of compressed air to said passage, a cylinder member carried by the rear head and situated to receive the air delivered from said air passage, said cylinder member having discharge ports leading to the air-circulating chamber, a plunger in said cylinder normally closing the discharge ports but movable by air pressure admitted to the cylinder member into a position to open said ports when the control valve is opened, a post carried by the apertured head, a sleeve of insulating material slidable on the post and engaging said plunger, a spring engaging the sleeve and acting therethrough to yieldingly hold the plunger in retracted position, and means for closing the circuit of the heating element when the sleeve is moved forwardly by action of the plunger, said means comprising contact arms engaging the sleeve, and a contact ring carried by the sleeve and with which the arms are brought into contact when the sleeve is moved forwardly by the plunger.

JOHN C. McMURRAY.